United States Patent
Gupta (10) Patent No.: US 11,080,741 B2
(45) Date of Patent: Aug. 3, 2021

(54) DIGITAL WALLET PAYMENT SYSTEM AND PROCESS

(71) Applicant: MASTERCARD INTERNATIONAL INCORPORATED, Purchase, NY (US)

(72) Inventor: Sudhir Gupta, Pune (IN)

(73) Assignee: MasterCard International Incorporated, Purchase, NY (US)

( * ) Notice: Subject to any disclaimer, the term of this patent is extended or adjusted under 35 U.S.C. 154(b) by 340 days.

(21) Appl. No.: 15/960,146

(22) Filed: Apr. 23, 2018

(65) Prior Publication Data

US 2018/0308117 A1    Oct. 25, 2018

(30) Foreign Application Priority Data

Apr. 24, 2017  (SG) .............................. 10201703331T (51) Int. Cl.
| | | |
|---|---|---|
| *G06Q 30/02* | (2012.01) | |
| *G06Q 20/36* | (2012.01) | |
| *G06Q 20/32* | (2012.01) | |
| *G06Q 20/22* | (2012.01) | |

(52) U.S. Cl.
CPC ....... *G06Q 30/0226* (2013.01); *G06Q 20/227* (2013.01); *G06Q 20/32* (2013.01); *G06Q 20/36* (2013.01)

(58) Field of Classification Search
CPC .. G06Q 30/0226; G06Q 20/227; G06Q 20/32; G06Q 20/36
USPC ...................................... 705/14.1, 41, 39, 67
See application file for complete search history.

(56) References Cited

U.S. PATENT DOCUMENTS

| | | | |
|---|---|---|---|
| 2012/0290472 A1* | 11/2012 | Mullen | G06Q 10/00 705/39 |
| 2013/0254115 A1* | 9/2013 | Pasa | G06Q 20/3572 705/67 |
| 2013/0339233 A1* | 12/2013 | Lee | G06Q 20/36 705/41 |
| 2015/0254639 A1* | 9/2015 | Radu | G06Q 20/3674 705/41 |
| 2016/0248479 A1* | 8/2016 | Bellenger | H04W 4/80 |
| 2018/0039982 A1 | 2/2018 | Metnick et al. | |
| 2018/0039989 A1 | 2/2018 | Beye et al. | |
| 2018/0047016 A1 | 2/2018 | Sarin | |
| 2018/0053169 A1 | 2/2018 | James | |
| 2018/0075420 A1 | 3/2018 | Barnett et al. | |
| 2018/0075453 A1 | 3/2018 | Durvasula et al. | |
| 2018/0082284 A1 | 3/2018 | Gomes et al. | |
| 2018/0082295 A1 | 3/2018 | Boucard | |
| 2018/0089598 A1 | 3/2018 | Sedlarevic et al. | |

(Continued)

FOREIGN PATENT DOCUMENTS

GB         2502551 A  * 12/2013  ........... G06Q 20/384

OTHER PUBLICATIONS

John Rampton, How Digital Wallets and Mobile Payments Are Evolving and What It Means for You, 2017 (Year: 2017).*

(Continued)

*Primary Examiner* — Tarek Elchanti
(74) *Attorney, Agent, or Firm* — Jordan IP Law, LLC (57) ABSTRACT

A system and method for carrying out a transaction using a plurality of digital wallets, in a manner whereby benefits and/or perks of using each respective digital wallet is optimized in relation to a quantum of the transaction is provided.

19 Claims, 6 Drawing Sheets

(56) References Cited

U.S. PATENT DOCUMENTS

| | | |
|---|---|---|
| 2018/0089672 A1 | 3/2018 | Choo et al. |
| 2018/0101857 A1 | 4/2018 | Deliwala et al. |
| 2018/0108008 A1 | 4/2018 | Chumbley |
| 2018/0108010 A1 | 4/2018 | McHale et al. |

OTHER PUBLICATIONS

PCT International Search Report and Written Opinion, Application No. PCT/US2018/025025, dated Jun. 15, 2018, 11 pps.

\* cited by examiner

DIGITAL WALLET PAYMENT SYSTEM AND PROCESS

CROSS REFERENCE TO RELATED APPLICATIONS

This patent application claims priority to Singapore Application No. 10201703331T filed on Apr. 24, 2017, the disclosure of which is incorporated by reference herein in its entirety as part of the present application.

BACKGROUND

The present disclosure relates to a digital wallet payment system and process.

The popularity of electronic transactions or 'e-commerce' continues to increase, facilitating the purchase of goods and/or services over communication networks such as the Internet. In order to improve the convenience and security of electronic transactions over unsecured communications networks, payment services generally referred to as "digital wallets" (or "mobile wallets") have recently been developed in order to allow customers to make electronic payments conveniently and without exposing their actual account information to eavesdroppers, while in many cases also accumulating loyalty points or credits. A customer's digital wallet typically stores information that can be used to determine the customer's payment, billing and shipping information, allowing nearly frictionless checkout for the customer. In a sense, a digital wallet can be seen to provide a replacement for physical payment cards in the customer's traditional physical wallet. Some forms of digital wallet also can be used to store pre-payments or credit, constituting a replacement for cash in a traditional physical wallet. Examples of digital wallets include Masterpass™, PayPal™, Apple Pay™, and Android Pay™.

A shortcoming of existing payment services is that, because they offer different advantages, many users will have multiple accounts with different service providers. In India, for example, there are many different pre-paid digital wallet providers providing different offers to their customers; for example, Mobikwik™, HFDC Bank's PayZapp™, and PayTM™. As a result, a customer may have many different digital wallets. In particular with such prepaid accounts, a user may have positive balances distributed over multiple different service provider accounts. This results in a number of disadvantages, including the difficulty of managing balances across multiple accounts, the difficulty of managing all of the different authentication credentials for different services, and the need to choose only one account for each payment.

Despite the substantial advances in digital wallet payment technologies that have been made to date, there remains room for improvement.

It is desired to provide a digital wallet payment system and process that alleviate one or more difficulties of the prior art, or that at least provide a useful alternative.

BRIEF DESCRIPTION

A first aspect of the present disclosure provides a payment system including at least one processor configured to receive, from a merchant payment system, a request for payment of a transaction amount from a customer, generate, in response to the reception of the request for payment, at a user device, display data representing an interactive graphical user interface for display to the customer, the interactive graphical user interface being configured to display at least one identifier of a payment card of the customer, input, via the interactive graphical user interface at the user device, a corresponding payment amount to be paid using a corresponding digital wallet, initiate, via the interactive graphical user interface at the user device, payments of the respective payment amounts to be paid to a merchant from at least one digital wallet and at least one payment card, and transmit, to the merchant payment system, a response to the request for payment to be sent to the merchant payment system, the response representing that payment of the transaction amount had been made using only the payment card of the customer.

A second aspect of the present disclosure provides a computer-implemented method for carrying out a payment, the method being executed by at least one processor of a payment system, and including the steps of receiving, from a merchant payment system, a request for payment of a transaction amount from a customer, generating, in response to the reception of the request for payment, at a user device, display data representing an interactive graphical user interface for display to the customer, the interactive graphical user interface being configured to display at least one identifier of a payment card of the customer, inputting, via the interactive graphical user interface at the user device, a corresponding payment amount to be paid using a corresponding digital wallet, initiating, via the interactive graphical user interface at the user device, payments of the respective payment amounts to be paid to a merchant from at least one digital wallet and at least one payment card, and transmitting, to the merchant payment system, a response to the request for payment to be sent to the merchant payment system, the response representing that payment of the transaction amount had been made using only the payment card of the customer.

A third aspect of the present disclosure provides a payment system, including at least one payment server including at least one network interface, a memory, and at least one processor configured to effect a merchant payment transaction of a merchant payment amount from a customer to a merchant in response to a request from a payment server of the merchant, wherein the at least one processor is configured to effect the merchant payment by making corresponding multiple payment transactions using respective digital wallets, details of the multiple payment transactions being provided to a payment server of the merchant so that the merchant can reward the customer for respective offers of the digital wallets.

A further aspect of the present disclosure provides a customer computer for use in a payment system, including at least one processor configured to receive, from a merchant payment system, a request for payment of a transaction amount from a customer, generate, in response to the reception of the request for payment, display data representing an interactive graphical user interface for display to the customer, the interactive graphical user interface being configured to display at least one identifier of a payment card of the customer, input, via the interactive graphical user interface, a corresponding payment amount to be paid using a corresponding digital wallet, initiate, via the interactive graphical user interface, payments of the respective payment amounts to be paid to a merchant from at least one digital wallet and at least one payment card, and transmit, to the merchant payment system, a response to the request for payment to be sent to the merchant payment system, the response representing that payment of the transaction amount had been made using only the payment card of the customer.

A final aspect of the present disclosure provides a non-transitory computer readable storage medium embodying thereon a program of computer readable instructions which, when executed by one or more processors of an customer computer in communication with at least one merchant payment system, cause the customer computer to carry out a method for payment, the method embodying the steps of receiving, from a merchant payment system, a request for payment of a transaction amount from a customer, generating, in response to the reception of the request for payment, display data representing an interactive graphical user interface for display to the customer, the interactive graphical user interface being configured to display at least one identifier of a payment card of the customer, inputting, via the interactive graphical user interface, a corresponding payment amount to be paid using a corresponding digital wallet, initiating, via the interactive graphical user interface, payments of the respective payment amounts to be paid to a merchant from at least one digital wallet and at least one payment card, and transmitting, to the merchant payment system, a response to the request for payment to be sent to the merchant payment system, the response representing that payment of the transaction amount had been made using only the payment card of the customer.

BRIEF DESCRIPTION OF THE DRAWINGS

Some embodiments of the present disclosure are hereinafter described, by way of example only, with reference to the accompanying drawings, wherein.

DETAILED DESCRIPTION

The present disclosure provides a payment system and process that address at least some of the difficulties with existing payment systems by providing a single payment service that is able to make a single payment using multiple different other payment services or digital wallets. That is, a user can select two or more of any number of different payment services registered with the system, and use them to simultaneously provide portions of a total payment. The details of the multiple payments are then provided to the merchant or payee. This not only simplifies the use of multiple payment accounts and digital wallets, but also allows a user to simultaneously benefit from multiple offers provided by different payment service providers when making a single payment.

Figure 1:
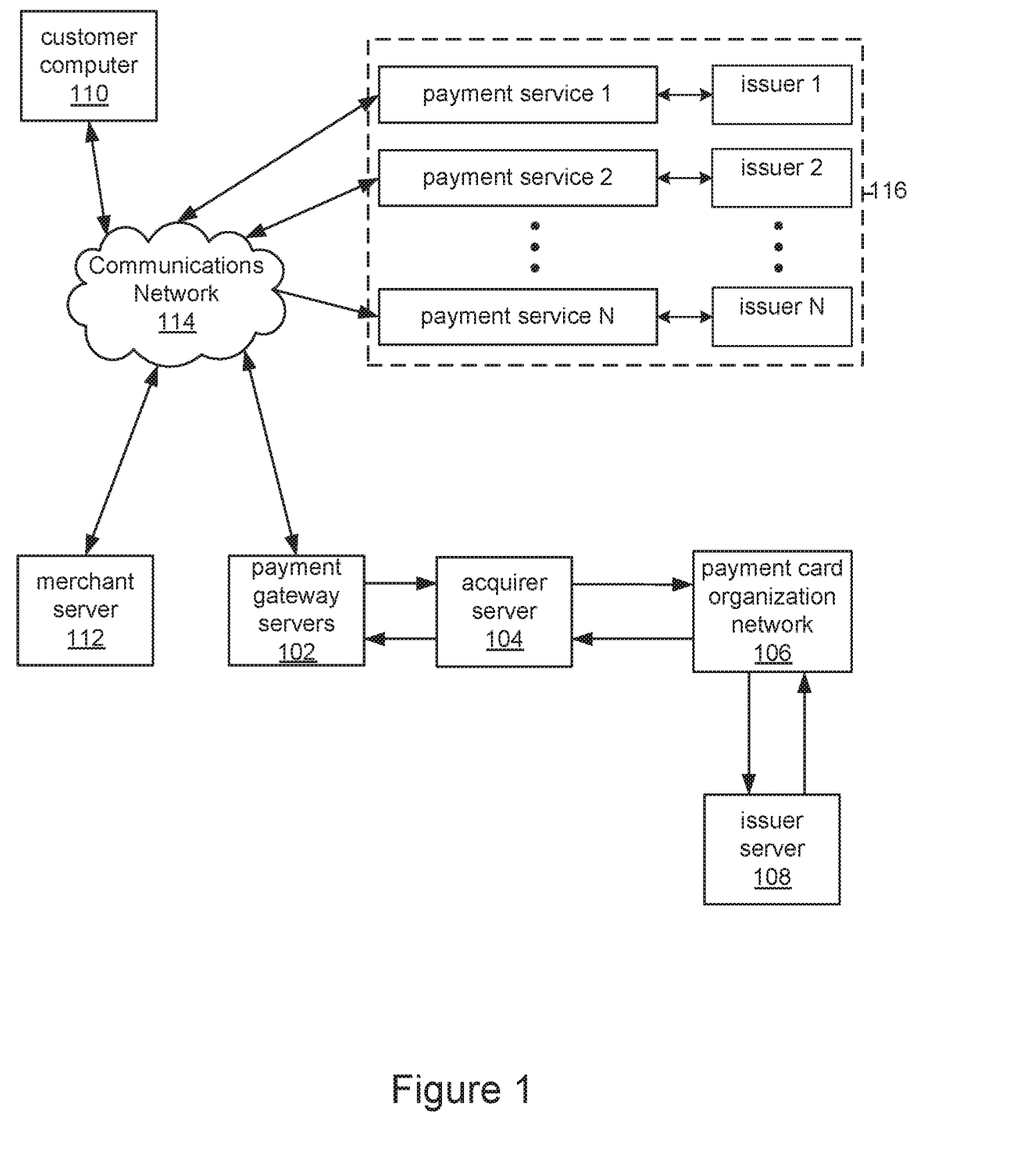
FIG. 1 is a schematic diagram of a payment system in accordance with some embodiments of the present disclosure enabling the automated coordination of multiple payments from multiple issuers of a customer to effect a single payment transaction to a merchant.
Figure 3A:
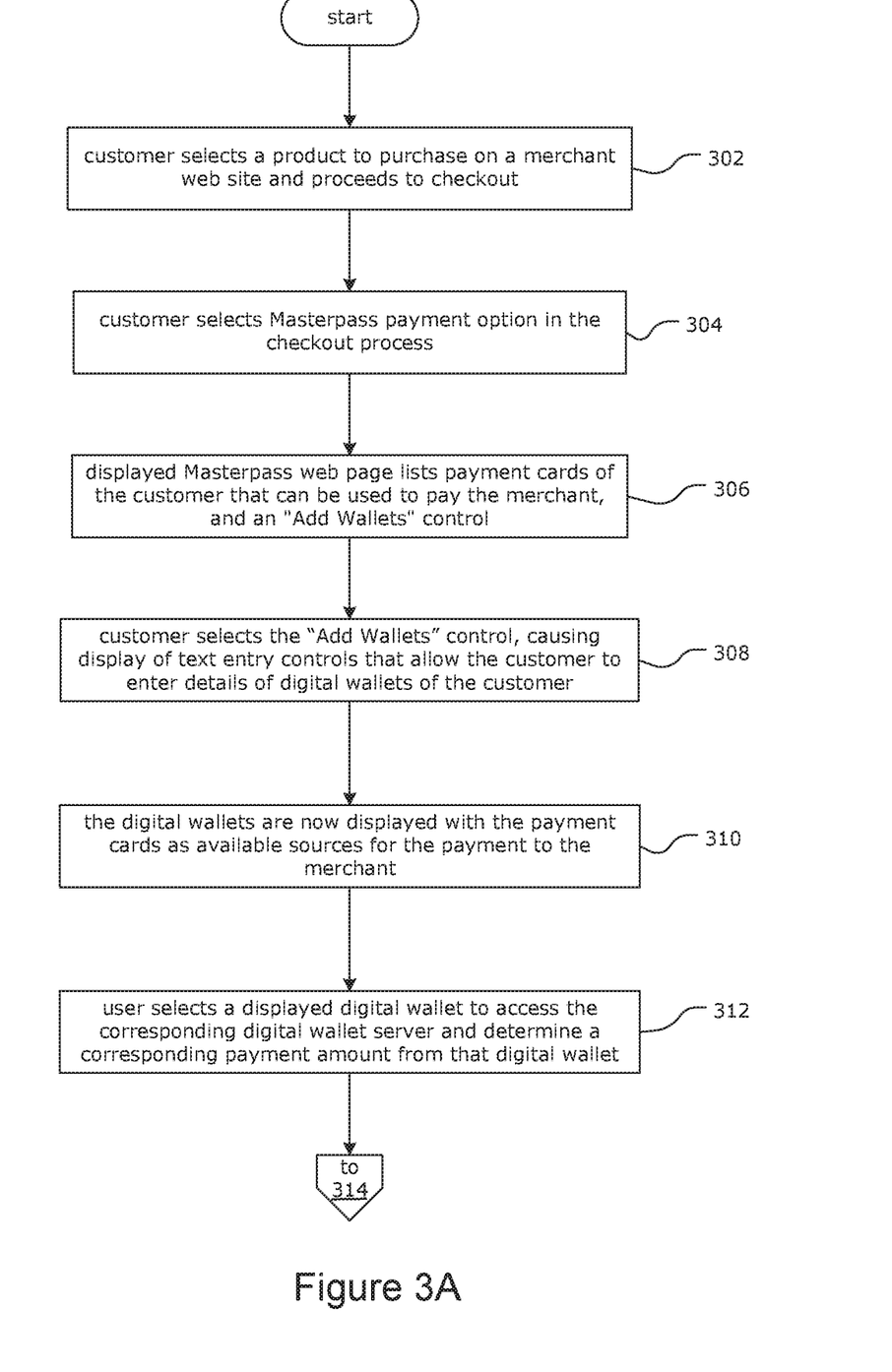
FIGS. 3A and 3B show a flow diagram of a payment gateway process of the payment gateway system.
Figure 3B:
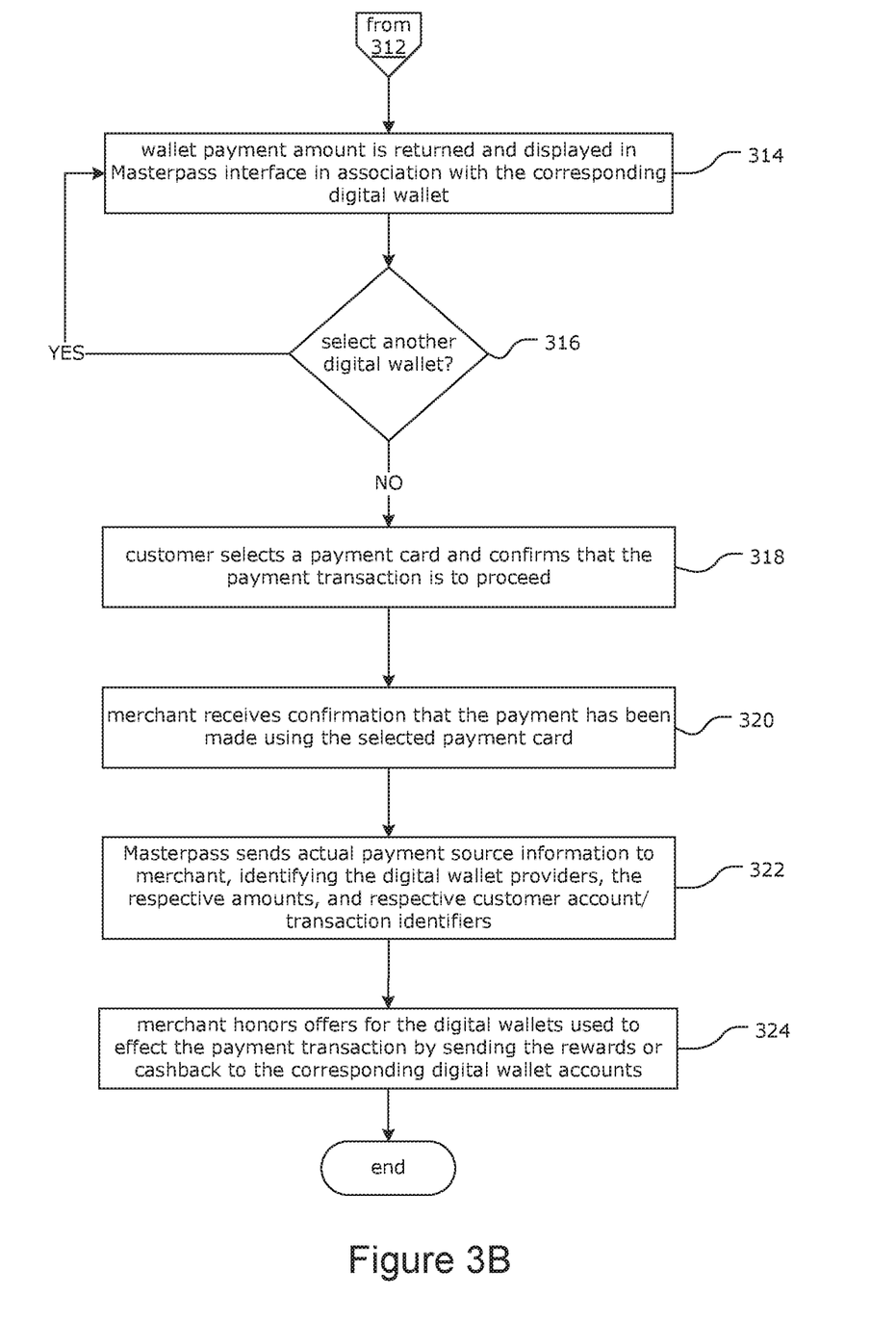

As shown in FIG. 1, a payment system includes a payment gateway servers 102, acquirer server 104 (referred to hereinafter for convenience as "the acquirer"), a payment card organization network 106, and issuer server 108 (referred to hereinafter for convenience as "the issuer"). The payment system executes a payment process, as shown in FIGS. 3A and 3B, which allows a customer of a merchant to use a computing device 110 of the customer to access servers 112 of the merchant via a communications network 114 such as the Internet to purchase goods and/or services of the merchant. In accordance with embodiments of the present disclosure, the customer pays for the goods and/or services in a single payment transaction with the merchant, but constituted by multiple part-payments made using a plurality of digital wallet servers of respective payment services 116 of the customer.

The general architecture and components of the merchant servers 112, the payment gateway servers 102, the acquirer servers 104, the issuer servers 108, and the payment organization network 106 will be familiar to those skilled in the art of electronic commerce and payment systems, and need not be described in this specification except where they differ from the prior art in order to implement the disclosure. For example, the merchant servers 112 will generally include at least one Web server for serving webpages to customers of the merchant, and at least one back-end server for managing e-commerce purchase and payment transactions between the merchant and its customers.

Embodiments of the present disclosure will now be described in the context of e-commerce payments made using the MasterCard™ Masterpass™ payment service, however, it should be understood that other payment services may be used in other embodiments, with appropriate modifications that will be apparent to those skilled in the art. In the described embodiments, the MasterCard™ Masterpass™ payment service is implemented by the payment gateway servers 102.

Figure 2:
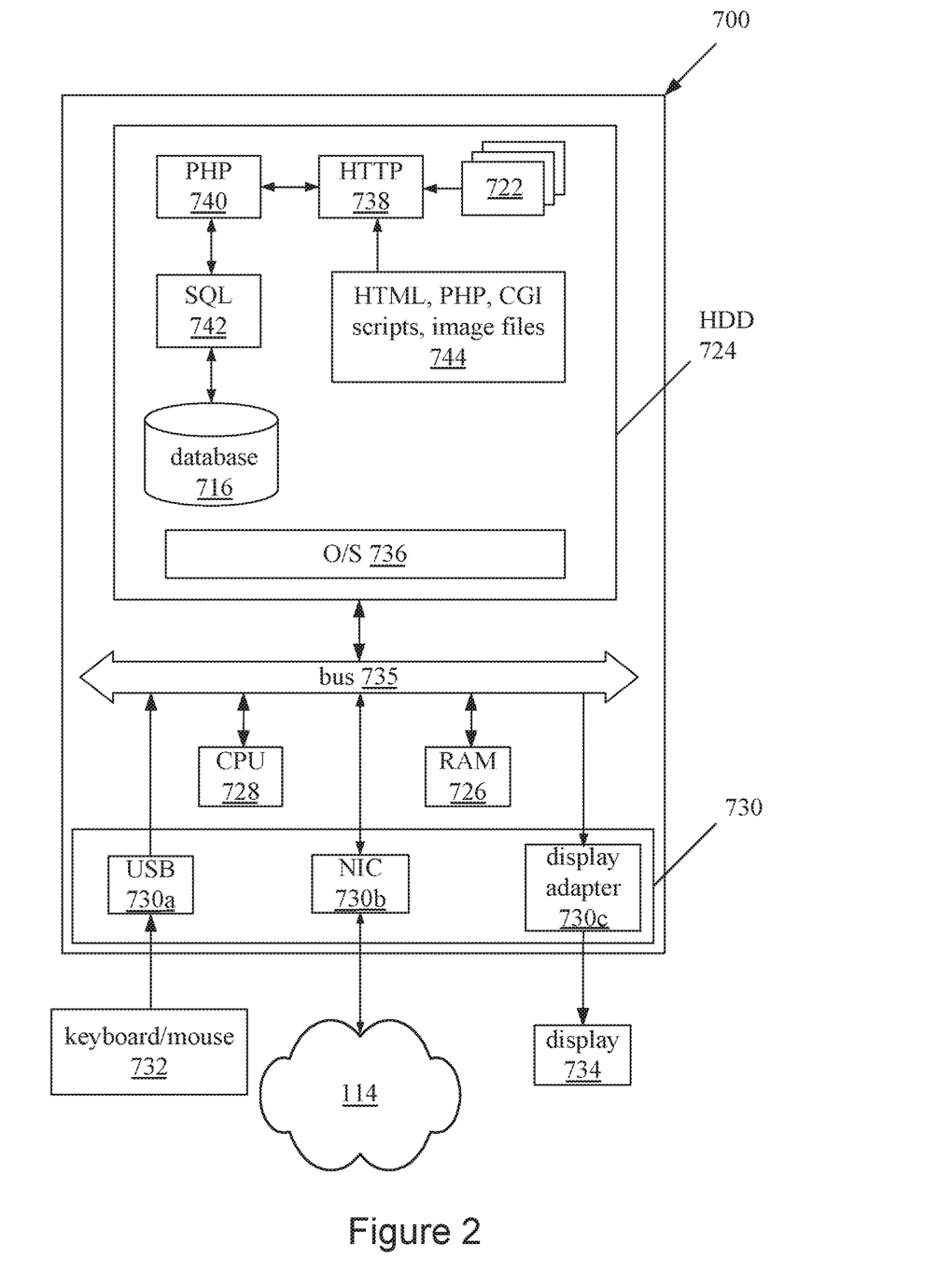
FIG. 2 is a schematic diagram showing components of a payment gateway server of the payment system in accordance with some embodiments of the present disclosure.

FIG. 2 is a schematic diagram showing the components of a payment server 700 of the payment gateway 102, where the payment process described herein is implemented in the form of executable instructions of one or more payment components of a computer server. However, it will be apparent to those skilled in the art that some or all of the process steps executed by the payment gateway 102 could alternatively be implemented as configuration data for one or more Field-Programmable Gate Arrays (FPGAs) or as dedicated hardware components such as Application-Specific Integrated Circuits (ASICs).

In this example, the payment server 700 is a commercially available server computer system based on a 32 bit or a 64 bit Intel architecture, and the processes and/or methods executed or performed by the payment server 700 are implemented in the form of programming instructions of one or more software components or modules 722 stored on non-volatile (e.g., hard disk) computer-readable storage 724 associated with the payment server 700. At least parts of the software modules 722 could alternatively be implemented as one or more dedicated hardware components, such as application-specific integrated circuits (ASICs) and/or field programmable gate arrays (FPGAs).

The payment server 700 includes at least one or more of the following standard, commercially available, computer components, all interconnected by a bus 735:
1. random access memory (RAM) 726;
2. at least one computer processor 728; and
3. external computer interfaces 730:
   a. universal serial bus (USB) interfaces 730a (at least one of which is connected to one or more user-interface devices, such as a keyboard, a pointing device (e.g., a mouse 732 or touchpad);

b. a network interface connector (NIC) 730*b* which connects the computer system 700 to a data communications network, such as the Internet 20; and c. a display adapter 730*c*, which is connected to a display device 734 such as a liquid-crystal display (LCD) panel device.

The payment server 700 includes a plurality of standard software modules, including:

1. an operating system (OS) 736 (e.g., Linux or Microsoft Windows);

2. web server software 738 (e.g., Apache, available at www.apache.org);

3. scripting language modules 740 (e.g., personal home page or PHP, available at www.php.net, or Microsoft ASP); and 4. structured query language (SQL) modules 742 (e.g., MySQL, available from www.mysql.com), which allow data to be stored in and retrieved/accessed from an SQL database 716.

Together, the web server 738, scripting language 740, and SQL modules 742 provide the payment server 700 with the general ability to allow users of the communications network 114 with standard computing devices equipped with requisite software to access the payment server 700 and in particular to provide data to and receive data from the database 716. It will be understood by those skilled in the art that the specific functionality provided by the payment server 700 to such users is provided by scripts accessible by the web server 738, including the one or more software modules 722 implementing the processes performed by the payment server 700, and also any other scripts and supporting data 744, including markup language (e.g., HTML, XML) scripts, PHP (or ASP), and/or CGI scripts, image files, style sheets, and the like.

The boundaries between the modules and components in the software modules 722 are exemplary, and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, the operations may be combined or the functionality of the operations may be distributed in additional operations in accordance with the disclosure. Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagrams of the processes of the payment server 700 may be executed by a module (of software modules 722) or a portion of a module. The processes may be embodied in a non-transient machine-readable and/or computer-readable medium for configuring a computer system to execute the method. The software modules may be stored within and/or transmitted to a computer system memory to configure the computer system to perform the functions of the module.

The payment server 700 normally processes information according to a program (a list of internally stored instructions such as a particular application program and/or an operating system) and produces resultant output information via input/output (I/O) devices 730. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Figure 5:
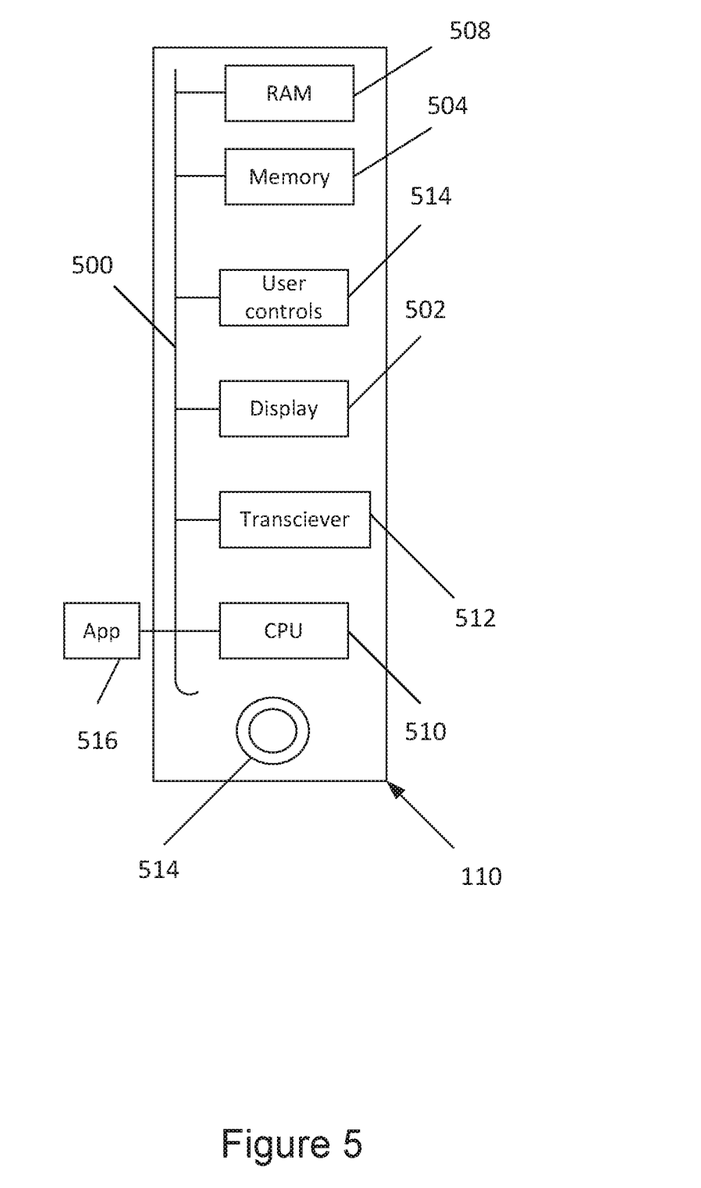
FIG. 5 is a schematic diagram showing components of a customer computer of the payment system in accordance with some embodiments of the present disclosure.

FIG. 5 is a schematic diagram showing the components of the customer computer 110 of the payment system. The customer computer 110 can be a handheld computer device such as a smart phone or a PDA such as one manufactured by Apple™, LG™, HTC™, BlackBerry Limited™, or Motorola™. The customer computer 110 can also be a tablet computer or a wearable gadget. An exemplary embodiment of the customer computer 110 is shown in FIG. 5. As shown, the customer computer 110 includes the following components in electronic communication via a bus 500:

1. a display 502;
2. non-volatile memory 504;
3. random access memory ("RAM") 508;
4. N processing components 510;
5. a transceiver component 512 that includes N transceivers; and
6. user controls 514.

Although the components depicted in FIG. 5 represent physical components, FIG. 5 is not intended to be a hardware diagram. Thus, many of the components depicted in FIG. 5 may be realized by common constructs or distributed among additional physical components. Moreover, it is certainly contemplated that other existing and yet-to-be developed physical components and architectures may be utilized to implement the functional components described with reference to FIG. 5.

The display 502 generally operates to provide a presentation of content to a user, and may be realized by any of a variety of displays (e.g., CRT, LCD, HDMI, micro-projector, and OLED displays). And in general, the non-volatile memory 504 functions to store (e.g., persistently store) data and executable code including code that is associated with the functional components of a browser component and a payment App 516. In some embodiments, for example, the non-volatile memory 504 includes bootloader code, modem software, operating system code, file system code, and code to facilitate the implementation of one or more portions of the payment App 516 as well as other components well known to those of ordinary skill in the art that are not depicted for simplicity.

In many implementations, the non-volatile memory 504 is realized by flash memory (e.g., NAND or ONENAND memory), but it is certainly contemplated that other memory types may be utilized as well. Although it may be possible to execute the code from the non-volatile memory 504, the executable code in the non-volatile memory 504 is typically loaded into RAM 508 and executed by one or more of the N processing components 510.

The N processing components 510 in connection with RAM 508 generally operate to execute the instructions stored in non-volatile memory 504 to effectuate the functional components. As one of ordinarily skill in the art will appreciate, the N processing components 510 may include a video processor, modem processor, DSP, graphics processing unit (GPU), and other processing components.

The transceiver component 512 includes N transceiver chains, which may be used for communicating with external devices via wireless networks. Each of the N transceiver chains may represent a transceiver associated with a particular communication scheme. For example, each transceiver may correspond to protocols that are specific to local area networks, cellular networks (e.g., a CDMA network, a GPRS network, a UMTS network), and other types of communication networks.

Referring to the flow diagram of FIGS. 3A and 3B, at step 302, a customer uses a web browser application executing on the customer's computer 110 to access a merchant's online store, as represented by web pages served to the customer's web browser application by a web server of the merchant servers 112. On deciding to purchase a particular product of interest (e.g., Product X for $3,000), the customer selects that product for purchase by selecting a "buy" control or link on the merchant's webpages to add the desired product to the online store's shopping cart in the usual manner. As the customer does not wish to purchase any additional products, the customer selects a "checkout" control or link to proceed to the online store checkout.

The online store checkout page lists the selected product, together with the purchase price, and a list of available payment methods, including Masterpass™. At step 304, the customer selects a Masterpass™ pass link or control to initiate payment by Masterpass™. This causes control to be passed to the payment gateway 102, which causes display of the Masterpass™ 'lightbox', being a modal dialogue box floating above the merchant's checkout page, which is dimmed. After the customer is authenticated (for example, by entering an email address and corresponding password, or biometric information), at step 306 the Masterpass™ dialog box displays the customer's payment cards that have been registered with the Masterpass™ payment gateway 102, together with an interactive "Add Wallets" control or link. When the latter is selected, a dialogue box is displayed with interactive controls including text boxes that allow the customer to enter details of one or more digital wallet accounts of the customer at step 308.

For example, a customer in India may enter details of his or her accounts with the PayTM™, Mobikwik™, and HDFC PayZapp™ digital wallet payment services. When the customer has added all of the desired digital wallets and returned to the main Masterpass™ dialogue box, at step 310 the dialogue box now displays not only the payment cards that had been previously registered, but now also the various digital wallet payment providers that had been added at step 308.

The customer is able to view offers available from each digital wallet provider at their respective URLs, for example, the PayTM™ digital wallet service is offering a 10% cashback on purchases, the Mobikwik™ digital wallet service is offering 5% cashback on purchases, and HDFC PayZapp™ is offering hundred reward points on every purchase of $100 or more. It should be appreciated that the respective digital wallet services typically have a ceiling amount and a base amount with regard to when the cashback or conferment of reward points are applicable. Thus, any expenditure above the ceiling amount or below the base amount will not be entitled to the cashback or reward points.

Each of the names of the digital wallet services displayed in the dialogue box is associated with a link or control that, when selected by the customer, allows the customer to access the corresponding digital wallet service. Accordingly, at step 312, the customer selects each of the digital wallet service providers in turn, which takes the customer to the corresponding online digital wallet login page, where the customer can enter their login credentials. Once authenticated, the authentication credentials are stored by the Masterpass™ payment gateway 102 to automate future logins on the customer's behalf. For example, if Masterpass™ and the listed digital wallets have entered into respective agreements on terms and conditions for exposing authentication API's or web services, when a customer logs in to the Masterpass™ page and selects a digital wallet, correspondingly, Masterpass™ can send customer authentication details (which were stored during an earlier log-in) to the digital wallet web services for authentication of the customer. If there is no agreement between Masterpass™ and the listed digital wallets, this feature cannot be achieved and the customer has to log-in to the respective digital wallets every time they attempt to add digital wallets through Masterpass™ while carrying out a transaction.

Once the customer is authenticated, the customer can then see the current balance of their account with that digital wallet provider, and can add funds to that account in a standard manner. In any case, for each of the digital wallet services accessed by the customer, the customer enters a corresponding payment amount, being the amount to be paid from that digital wallet. After closing the interface of each digital wallet service provider, at step 314 the customer is returned to the Masterpass™ dialogue box, which is updated to show the amount to be paid from each digital wallet. If, at step 316, the customer decides to change the amount to be paid from any of the digital wallets, this can be done by repeating step 314 as described above.

For example, the customer has decided to pay $1,500 from a PayTM™ digital wallet (for example, $1,500 is the ceiling amount to receive the 10% cashback), $500 from a Mobikwik™ digital wallet (for example, $500 is the base amount to receive the 5% cashback), and the remaining $1,000 to be paid from a payment card. This is because the customer is not keen to accumulate reward points. Furthermore, at least a nominal sum should be paid from the payment card as a default configuration.

When satisfied with the amounts to be paid from each of the digital wallets, at step 318 the customer selects one of the displayed payment cards that is also to be used for the payment to the merchant, and confirms that the payment transaction is to proceed. The payment transaction is effected by effecting payments from all of the digital wallet service providers for the respective amounts set by the customer, with any shortfall in the total being provided from the payment card. When the transactions have been successfully made, at step 320 the Masterpass™ payment gateway 102 sends to the merchant a confirmation that the payment has been made, but indicating the source of the payment as being only the payment card selected by the customer. Thus, as far as the merchant servers are aware at this step, the payment has been made in the usual manner, using only a single payment card for the total payment amount of $3,000, which allows existing and standard protocols and process steps to be used in this part of the process.

However, subsequently, at step 322, the Masterpass™ payment gateway sends the actual payment source information to the merchant servers 112, identifying the digital wallet providers (PayTM™ and Mobikwik™), the respective payment amounts ($1,500 and $500, respectively), and respective customer account/transaction identifiers. In step 324, the merchant servers 112 use this information to honor the offers that were applicable to each digital wallet at the time of making the payment, using standard process steps to transfer cashbacks and/or reward points to the digital wallets of the customer, for each of the digital wallets used to effect the single purchase transaction.

Figure 4:
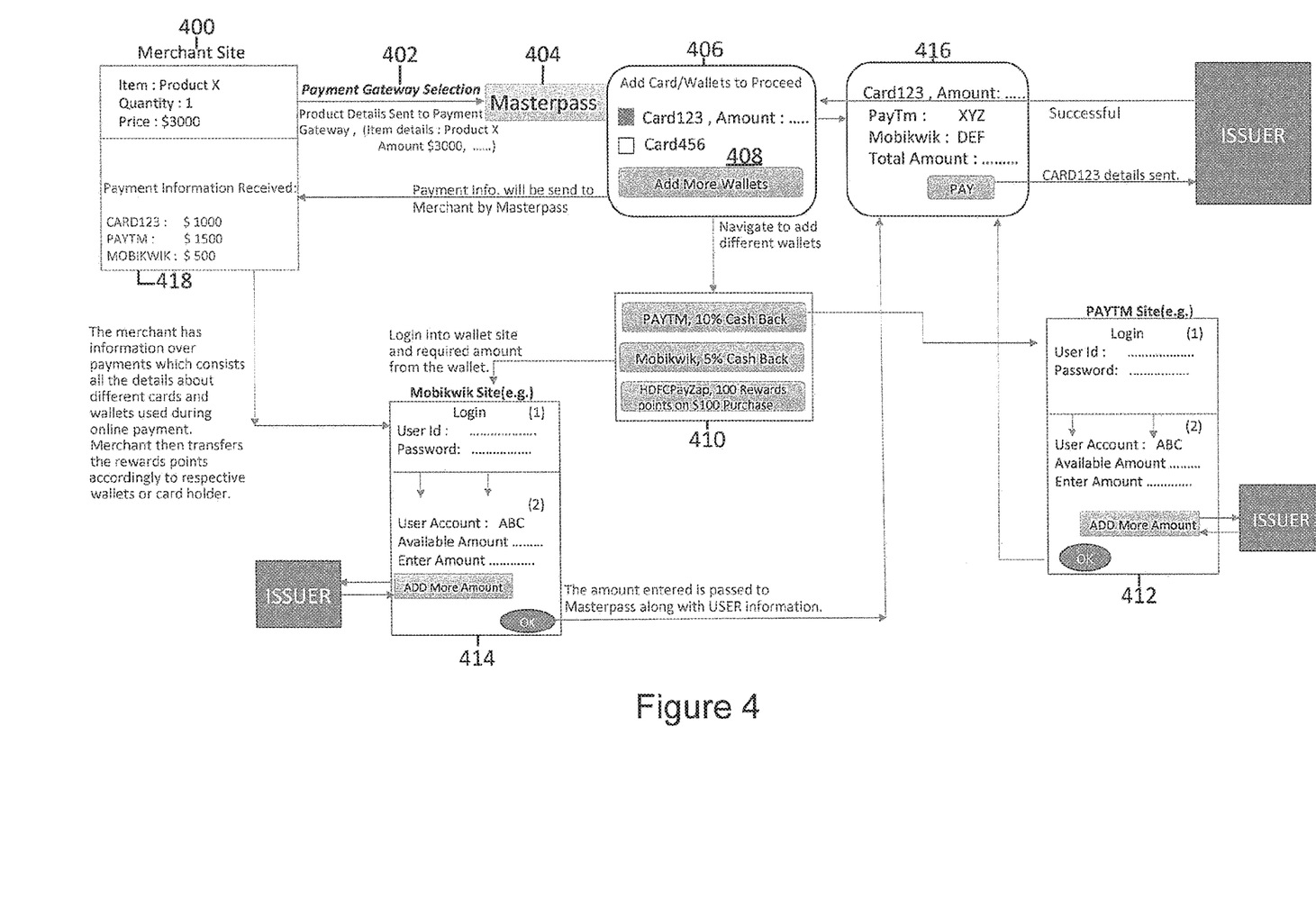
FIG. 4 is a schematic diagram illustrating the various steps of the payment gateway process.

Referring to FIG. 4, there is shown a simplified schematic diagram of the process of FIG. 3. A customer uses a web browser application executing on the customer's computer 110 to access a merchant's online store 400, as represented by web pages served to the customer's web browser application by a web server of the merchant servers 112. On deciding to purchase a particular product of interest (e.g., Product X for $3,000), the customer selects that product for purchase by selecting a "buy" control or link on the merchant's webpages to add the desired product to the online store's shopping cart in the usual manner. As the customer does not wish to purchase any additional products, the customer selects a "checkout" control or link to proceed to the online store checkout.

When the customer selects a Masterpass™ pass link/ control to initiate payment by Masterpass™ 402, this causes control to be passed to the payment gateway 102, which causes display of the Masterpass™ 'lightbox' 404, being a modal dialogue box floating above the merchant's checkout page, which is dimmed. After the customer is authenticated (for example, by entering an email address and corresponding password, or biometric information), the Masterpass™ dialog box 406 displays the customer's payment cards that have been registered with the Masterpass™ payment gateway 102, together with an interactive "Add Wallets" control/ link 408.

For example, a customer in India may enter details of his or her accounts with the PayTM™, Mobikwik™, and HDFC PayZapp™ digital wallet payment services. The customer is able to view offers available from each digital wallet provider at their respective URLs 410, for example, the PayTM™ digital wallet service is offering a 10% cashback on purchases, the Mobikwik™ digital wallet service is offering 5% cashback on purchases, and HDFC PayZapp™ is offering hundred reward points on every purchase of $100 or more. It should be appreciated that the respective digital wallet services typically have a ceiling amount and a base amount with regard to when the cashback or conferment of reward points are applicable. Thus, any expenditure above the ceiling amount or below the base amount will not be entitled to the cashback or reward points.

Each of the names of the digital wallet services displayed in the dialogue box is associated with a link or control that, when selected by the customer, allows the customer to access the corresponding digital wallet service. Accordingly, the customer selects each of the digital wallet service providers in turn, which takes the customer to the corresponding online digital wallet login page 412/414, where the customer can enter their login credentials. Once authenticated, the authentication credentials are stored by the Masterpass™ payment gateway 102 to automate future logins on the customer's behalf. For example, if Masterpass™ and the listed digital wallets have entered into respective agreements on terms and conditions for exposing authentication API's or web services, when a customer logs in to the Masterpass™ page and selects a digital wallet, correspondingly, Masterpass™ can send customer authentication details (which were stored during an earlier log-in) to the digital wallet web services for authentication of the customer. If there is no agreement between Masterpass™ and the listed digital wallets, this feature cannot be achieved and the customer has to log-in to the respective digital wallets every time they attempt to add digital wallets through Masterpass™ while carrying out a transaction.

Once the customer is authenticated, for each of the digital wallet services accessed by the customer, the customer enters a corresponding payment amount, being the amount to be paid from that digital wallet. After closing the interface of each digital wallet service provider, at step 314 the customer is returned to the Masterpass™ dialogue box, which is updated to show the amount to be paid from each digital wallet 416. If the customer decides to change the amount to be paid from any of the digital wallets, this can be done by repeating earlier described steps.

For example, the customer has decided to pay $1,500 from a PayTM™ digital wallet (for example, $1,500 is the ceiling amount to receive the 10% cashback), $500 from a Mobikwik™ digital wallet (for example, $500 is the base amount to receive the 5% cashback), and the remaining $1,000 to be paid from a payment card. This is because the customer is not keen to accumulate reward points. Furthermore, at least a nominal sum should be paid from the payment card as a default configuration.

When satisfied with the amounts to be paid from each of the digital wallets, the customer selects one of the displayed payment cards that is also to be used for the payment to the merchant, and confirms that the payment transaction is to proceed. The payment transaction is effected by effecting payments from all of the digital wallet service providers for the respective amounts set by the customer, with any shortfall in the total being provided from the payment card. When the transactions have been successfully made, the Masterpass™ payment gateway 102 send to the merchant a confirmation that the payment has been made, but indicating the source of the payment as being only the payment card selected by the customer. Thus, as far as the merchant servers are aware at this step, the payment has been made in the usual manner, using only a single payment card for the total payment amount of $3,000, which allows existing and standard protocols and process steps to be used in this part of the process.

However, subsequently, the Masterpass™ payment gateway sends the actual payment source information to the merchant servers 112, identifying the digital wallet providers (PayTM™ and Mobikwik™), the respective payment amounts ($1,500 and $500, respectively), and respective customer account/transaction identifiers 418. The merchant servers 112 use this information to honor the offers that were applicable to each digital wallet at the time of making the payment, using standard process steps to transfer cashbacks and/or reward points to the digital wallets of the customer, for each of the digital wallets used to effect the single purchase transaction.

Accordingly, it will be apparent from the above that the described embodiments of the present disclosure allow a customer to take advantage of multiple benefits provided by different payment providers for a single purchase transaction.

If Masterpass™ stores respective account credentials of the customer's digital wallets, subsequent invocations of the Masterpass™ payment gateway 102 enables internal authentication with each of the customer's digital wallets, which are then automatically listed with the payment cards of the customer in the Masterpass™ dialogue box, together with an indication of the respective amount deducted for each digital wallet. Once the transaction is complete, the merchant then subsequently honors any offer (for example, reward points, cashback and so forth) directly to the customer digital wallets.

Many modifications will be apparent to those skilled in the art without departing from the scope of the present disclosure.

What is claimed is:

1. A payment system including at least one processor configured to:
   receive, from a merchant payment system associated with a merchant, a request for payment of a transaction amount from a customer;
   generate, in response to the reception of the request for payment, at a user device, display data representing an interactive graphical user interface for display to the customer, the interactive graphical user interface configured to display a plurality of identifiers including a first identifier of a first digital wallet, and a second identifier identifying a payment card of the customer or a second digital wallet of the customer;
   automatically transmit customer authentication details to a digital wallet web service provider for authentication of the customer in response to a selection of the first digital wallet, wherein the customer authentication details are stored during a previous log-in to bypass re-entry of the customer authentication details;
   identify, via the interactive graphical user interface at the user device, a first payment amount to be paid using the first digital wallet, wherein the first payment amount is to be paid in response to the request for payment;
   identify, via the interactive graphical user interface, a second payment amount to be paid using the payment card or the second digital wallet, wherein the second payment amount is to be paid in response to the request for payment;
   initiate, via the interactive graphical user interface at the user device, payments of the first and second payment amounts to be paid to the merchant so that the first payment amount is paid from the first digital wallet and the second payment amount is paid from the payment card or the second digital wallet;
   automatically transmit, to the merchant payment system, a response to the request for payment, the response representing that an entire payment of the transaction amount had been made using only the payment card or the second digital wallet of the customer, while bypassing indicating that the first digital wallet is used for the first payment amount, to process the payment of the transaction with an existing single payment protocol of a merchant server of the merchant payment system; and
   after the response is transmitted, automatically transmit to the merchant payment system, that the first payment amount is to be paid from the first digital wallet, and the second payment amount is to be paid from the payment card or the second digital wallet.

2. The payment system according to claim 1, wherein the at least one processor is further configured to:
   input, via at least one interactive component of the interactive graphical user interface, authentication details of the first or second digital wallet.

3. The payment system according to claim 1, wherein the second payment amount is to be paid using the second digital wallet.

4. The payment system according to claim 1, wherein the interactive graphical user interface is configured to display offers of the first or second digital wallets.

5. The payment system according to claim 1, wherein the second payment amount is to be paid using the payment card.

6. The payment system according to claim 1, wherein the at least one processor is further configured to:
   provide, to a payment server of the merchant, details of the first and second payment amounts so that the merchant can reward the customer for respective offers of one or more of the first or second digital wallets.

7. A computer-implemented method for carrying out a payment, the method being executed by at least one processor of a payment system, and including the operations of:
   receiving, from a merchant payment system associated with a merchant, a request for payment of a transaction amount from a customer;
   generating, in response to the reception of the request for payment, at a user device, display data representing an interactive graphical user interface for display to the customer, the interactive graphical user interface configured to display a plurality of identifiers including a first identifier of a first digital wallet, and a second identifier identifying one or more of a payment card of the customer or a second digital wallet of the customer;
   automatically transmitting customer authentication details to a digital wallet web service provider for authentication of the customer in response to a selection of the first digital wallet, wherein the customer authentication details are stored during a previous log-in to bypass re-entry of the customer authentication details;
   identifying, via the interactive graphical user interface at the user device, a first payment amount to be paid using the first digital wallet, wherein the first payment amount is to be paid in response to the request for payment;
   identifying, via the interactive graphical user interface, a second payment amount to be paid using the payment card or the second digital wallet, wherein the second payment amount is to be paid in response to the request for payment;
   initiating, via the interactive graphical user interface at the user device, payments of the first and second payment amounts to be paid to the merchant so that the first payment amount is paid from the first digital wallet and the second payment amount is paid from the payment card or the second digital wallet;
   automatically transmitting, to the merchant payment system, a response to the request for payment, the response representing that an entire payment of the transaction amount had been made using only the payment card or the second digital wallet of the customer, while bypassing indicating that the first digital wallet is used for the first payment amount, to process the payment of the transaction with an existing single payment protocol of a merchant server of the merchant payment system; and
   after the response is transmitted, automatically transmitting to the merchant payment system, that the first payment amount is to be paid from the first digital wallet, and the second payment amount is to be paid from the payment card or the second digital wallet.

8. The method according to claim 7, further including:
   inputting, via at least one interactive component of the interactive graphical user interface, authentication details of the first or second digital wallet.

9. The method according to claim 7, wherein the second payment amount is to be paid using second digital wallet.

10. The method according to claim 7, wherein the interactive graphical user interface is configured to display offers of the first or second digital wallets.

11. The method according to claim 7, wherein the second payment amount is to be paid using the payment card.

12. The method according to claim 7, further including:
providing, to a payment server of the merchant, details of the first and second payment amounts so that the merchant can reward the customer for respective offers of one or more of the first or second digital wallets.

13. A payment system comprising:
at least one payment server including:
at least one network interface;
a memory; and
at least one processor configured to effect a merchant payment transaction for a merchant payment amount from a customer to a merchant in response to a request for payment from a payment server of the merchant, wherein the at least one processor is configured to effect the merchant payment by:
automatically transmitting customer authentication details to a digital wallet web service provider for authentication of the customer in response to a selection of a first digital wallet, wherein the customer authentication details are stored during a previous log-in to bypass re-entry of the customer authentication details:
identifying a first payment amount to be paid using the first digital wallet, wherein the first payment amount is to be paid in response to the request for payment;
identifying a second payment amount to be paid using a payment card or a second digital wallet, wherein the second payment amount is to be paid in response to the request for payment;
automatically transmitting, to the payment server of the merchant, a response to the request for payment, the response representing that an entire payment of the merchant payment amount had been made using only the payment card or the second digital wallet, while bypassing indicating that the first digital wallet is used for the first payment amount, to process the payment of the transaction with an existing single payment protocol of the payment server of the merchant; and
after the response is transmitted, automatically transmitting to the payment server of the merchant, that the first payment amount is to be paid from the first digital wallet, and the second payment amount is to be paid from the payment card or the second digital wallet.

14. The payment system according to claim 13, wherein the at least one processor is configured to respond to the request from the payment server of the merchant as though the merchant payment transaction had been effected using only the payment card.

15. A non-transitory computer readable storage medium embodying thereon a program of computer readable instructions which, when executed by one or more processors of at least one computer, cause the at least one computer to carry out a method for payment, the method comprising:
receiving, from a merchant payment system associated with a merchant, a request for payment of a transaction amount from a customer;
generating, in response to the reception of the request for payment, display data representing an interactive graphical user interface for display to the customer, the interactive graphical user interface configured to display a plurality of identifiers including a first identifier of a first digital wallet, and a second identifier identifying a payment card of the customer or a second digital wallet of the customer;
automatically transmitting customer authentication details to a digital wallet web service provider for authentication of the customer in response to a selection of the first digital wallet, wherein the customer authentication details are stored during a previous log-in to bypass re-entry of the customer authentication details;
identifying, via the interactive graphical user interface, a first payment amount to be paid using the first digital wallet, wherein the first payment amount is to be paid in response to the request for payment;
identifying, via the interactive graphical user interface, a second payment amount to be paid using the payment card or the second digital wallet, wherein the second payment amount is to be paid in response to the request for payment;
initiating, via the interactive graphical user interface, payments of the first and second payment amounts to be paid to the merchant so that the first payment amount is paid from the first digital wallet and the second payment amount is paid from the payment card or the second digital wallet;
automatically transmitting, to the merchant payment system, a response to the request for payment, the response representing that an entire payment of the transaction amount had been made using only the payment card or the second digital wallet of the customer, while bypassing indicating that the first digital wallet is used for the first payment amount, to process the payment of the transaction with an existing single payment protocol of a merchant server of the merchant payment system; and
after the response is transmitted, automatically transmitting to the merchant payment system, that the first payment amount is to be paid from the first digital wallet, and the second payment amount is to be paid from the payment card or the second digital wallet.

16. The storage medium according to claim 15, the method further comprising:
inputting, via at least one interactive component of the interactive graphical user interface, authentication details of the first or second digital wallet.

17. The storage medium according to claim 15, wherein the second payment amount is paid using the second digital wallet.

18. The storage medium according to claim 15, wherein the interactive graphical user interface is configured to display offers of the first or second digital wallets.

19. The storage medium according to claim 17, wherein the second payment amount is paid using the payment card.

* * * * *